(12) United States Patent
Tyner et al.

(10) Patent No.: US 8,813,788 B2
(45) Date of Patent: *Aug. 26, 2014

(54) SEDIMENT AND DETENTION BASIN DRAINAGE SYSTEM AND METHOD

(71) Applicant: University of Tennessee Research Foundation, Knoxville, TN (US)

(72) Inventors: John Tyner, Knoxville, TN (US); Daniel C. Yoder, Knoxville, TN (US); Brent S. Pilon, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/011,134

(22) Filed: Aug. 27, 2013

(65) Prior Publication Data

US 2014/0008294 A1    Jan. 9, 2014

Related U.S. Application Data

(62) Division of application No. 13/099,511, filed on May 3, 2011, now Pat. No. 8,545,696.

(60) Provisional application No. 61/334,867, filed on May 14, 2010.

(51) Int. Cl.
| | | |
|---|---|---|
| *F15C 1/02* | (2006.01) | |
| *E03F 5/10* | (2006.01) | |
| *B01D 17/02* | (2006.01) | |
| *B01D 21/24* | (2006.01) | |
| *E03F 1/00* | (2006.01) | |

(52) U.S. Cl.
CPC ............ *B01D 21/2427* (2013.01); *E03F 5/105* (2013.01); *B01D 17/0208* (2013.01); *E03F 5/101* (2013.01); *E03F 5/103* (2013.01); *B01D 21/2422* (2013.01); *E03F 5/106* (2013.01); *B01D 21/2444* (2013.01); *B01D 2221/12* (2013.01); *E03F 1/00* (2013.01)
USPC ... 137/814; 137/561 R; 137/590; 210/170.03; 210/170.09; 210/532.1; 210/747.9

(58) Field of Classification Search
USPC ............ 137/814, 815, 803, 824, 590, 561 R; 210/170.03, 170.09, 532.1, 540, 747.9
See application file for complete search history.

(56) References Cited

U.S. PATENT DOCUMENTS 1,457,637 A    6/1923    Sievers
1,743,966 A *  1/1930    Goudard ......................... 137/80

(Continued)

OTHER PUBLICATIONS

Adler, Joseph, "Automatic Device for Emptying a Detention Pond at a Constant Flow Rate and Velocity," 1981 International Symposium, Lexington, KY, Jul. 27-30, 1981, pp. 445-451.

*Primary Examiner* — John K Fristoe, Jr.
*Assistant Examiner* — Minh Le
(74) *Attorney, Agent, or Firm* — Cameron LLP

(57) ABSTRACT

A fluid drainage system configured for draining a basin impounding fluid and sediment, solids or the like of varying density and turbidity. The system includes a first conduit and a second conduit within or adjacent to the first conduit to form a fluid receiving chamber between the first and second conduits, each conduit having apertures therethrough, with the apertures of the first and second conduits being sized and arranged relative to one another and so configured as to preferentially discharge fluid from the top of a basin, thus providing flow conditions which inhibit the entry of sediment into the system so as to maximize the retention of sediment within the basin and reduce turbidity and Total Suspended Sediment in the discharged fluid.

12 Claims, 13 Drawing Sheets

(56) References Cited

U.S. PATENT DOCUMENTS

| | | | | |
|---|---|---|---|---|
| 2,210,118 A | * | 8/1940 | Duncan | 236/1 A |
| 3,221,889 A | | 12/1965 | Hirsch | |
| 3,319,652 A | * | 5/1967 | Custer | 137/590 |
| 3,874,402 A | * | 4/1975 | Hazen | 137/137 |
| 4,015,629 A | | 4/1977 | Morgan et al. | |
| 4,246,927 A | * | 1/1981 | Eberle | 137/269 |
| 4,517,091 A | | 5/1985 | Yamanaka et al. | |
| 5,176,174 A | * | 1/1993 | Toraason et al. | 137/590 |
| 5,451,330 A | | 9/1995 | Garrett | |
| 5,702,593 A | | 12/1997 | Horsley et al. | |
| 5,759,415 A | * | 6/1998 | Adams | 210/776 |
| 5,766,470 A | * | 6/1998 | Burns | 210/406 |
| 5,820,751 A | | 10/1998 | Faircloth, Jr. | |
| 6,077,423 A | | 6/2000 | Roy et al. | |
| 6,093,314 A | * | 7/2000 | Wilson et al. | 210/99 |
| 6,337,016 B1 | * | 1/2002 | Alper | 210/265 |
| 6,416,674 B1 | | 7/2002 | Singleton et al. | |
| 6,919,033 B2 | | 7/2005 | Stark et al. | |
| 7,025,888 B2 | | 4/2006 | Thompson et al. | |
| 7,108,783 B2 | | 9/2006 | Glazic | |
| 7,473,373 B1 | | 1/2009 | Danler | |
| 7,556,158 B2 | | 7/2009 | Simpson et al. | |
| 7,762,741 B1 | | 7/2010 | Moody | |
| 7,790,023 B1 | | 9/2010 | Mills | |
| 7,846,327 B2 | | 12/2010 | Happel et al. | |
| 8,316,884 B1 | * | 11/2012 | England et al. | 137/561 A |
| 8,545,696 B2 | * | 10/2013 | Tyner et al. | 210/170.03 |
| 2003/0005965 A1 | * | 1/2003 | Flammia | 137/602 |
| 2010/0300981 A1 | | 12/2010 | Albers et al. | |

\* cited by examiner (a) Skimmer risers cross-section  (b) Traditional riser cross-section (a) Traditional riser discharge (b) Case 1 SSS inlet riser discharge (c) Case 2 SSS inlet riser discharge (d) Case 3 SSS outlet riser discharge (b) Traditional riser equivalent weir (a) Skimmer first riser equivalent weir

SEDIMENT AND DETENTION BASIN DRAINAGE SYSTEM AND METHOD

This application is a divisional of U.S. patent application Ser. No. 13/099,511 filed May 3, 2011 (now allowed) which claims the benefit of priority to U.S. Provisional Application Ser. No. 61/334,867, filed May 14, 2010, of the same inventors.

FIELD

The present disclosure relates to the field of sediment and detention basin drainage and, for example, to the field of storm water management, and more particularly to an improved system and method for draining a stormwater sediment or detention basin while reducing sediment and turbidity from the basin discharge.

BACKGROUND

Sedimentation is a leading cause of surface water impairment. Sediment transported from rural and urban surfaces has the potential to change stream flow patterns, to transport other pollutants such as metals and hydrocarbons, and to degrade aquatic habitat. According to the *National Water Quality Inventory: 2004 Report to Congress*, prepared under sections 305(b) and 303(d) of the Clean Water Act, at least 9% of the stream miles and 7% of the lake acres assessed were found to be impaired by sediment and turbidity. To decrease the negative impacts of stormwater on surface waters, the United States Environmental Protection Agency (EPA) has developed a manual of Best Management Practices (BMP's), which recommends structures such as sediment and detention basins. Detention basins have outlets designed to temporarily detain storm water runoff in order to attenuate peak discharges, while a primary purpose of sediment basins is to detain stormwater runoff long enough to allow sediments to settle. In both cases, however, there is a water quality benefit to be served by discharging cleaner water and retaining contaminants in the basin for stabilization and/or removal.

Sediment and/or detention ponds or basins are currently required for most new land disturbing activities (i.e., construction, roads, mining, forestry, and development). Generally speaking, more traditional agricultural entities have not yet been required to meet the same water quality standards of other industries, but that may change in the near future. One needs look no further than the increased environmental regulation at the hog, poultry, and dairy industries to see a general trend toward tightening environmental regulation, which could ultimately result in required sediment BMP's for disturbed agricultural lands.

Currently most communities regulate erosion and transport of sediment through a variety of required BMP's. These practices instruct a user how to reduce the sediment delivered to a creek, stream, pond, river, lake, or bay, but do not ensure that the user has implemented the BMP's well such that they are performing adequately. The U.S. Environmental Protection Agency (EPA) has written new regulations that the effluent from disturbed sites must have a turbidity of less than 280 Nephelometric Turbidity Units (NTU's). Although this rule is not yet implemented and is currently being appealed, it is clear that the United States is moving away from prescriptive BMP approaches towards performance-based approaches. This will drive users towards placing their money and efforts on erosion and sediment control technologies that meet performance-based turbidity requirements.

Detention basins are often used for reducing stormwater peak discharges, but there is regulatory movement towards demanding removal of contaminants from discharge even if there is little sediment being contributed from the associated drainage basin. Whether for sediment basins during soil disturbance or for post-disturbance detention basins, if pollutant removal is an important consideration, the common approach is to have a traditional vertical perforated riser as an outlet. This may not, however, be the most appropriate choice for pollutant removal, since such risers typically only force settling of 40%-70% of total suspended solids. Floating skimmers are available, and these function to discharge the cleanest water from the top of a basin, draining water by means of a single orifice submerged just below the surface such that only the cleanest water is discharged. Despite their benefits, floating skimmers are articulated by some means to maintain the orifice at just beneath the water level, and this required motion may be a potential source for failure. These skimmers are also prone to becoming stuck when the water is drained and the skimmer is lying on a drying muddy surface. Also, floating skimmers may be more susceptible to vandalism than are fixed traditional risers, as a floating skimmer may lie at the bottom of a basin when the basin is dry and be an attractive target for vandalism. Floating skimmers are also limited by a fixed outflow rate regardless of the stage (elevation of the water surface) in the basin, which limits their utility as detention basin outlets.

Accordingly, improvement is desired in the field of sediment basin outlet design towards improving stormwater discharge quality.

Now a brief history of the development of sediment and/or detention basin technology will be described. A traditional perforated riser for a stormwater basin is recommended by the EPA as of 2006. However, a riser was first used to discharge runoff from agricultural terraces in the 1940's by the United States Department of Agriculture (USDA) Soil Conservation Service (SCS) in Iowa. These risers were mounted flush to the ground and drained to a conduit below grade. The concept of using above-grade perforated risers to attenuate peak outflows by temporarily storing runoff above grade was first utilized in the 1960's by USDA SCS engineers in Iowa. Using a perforated riser outlet was found to decrease the peak flow rate from a terrace such that smaller subsurface piping could be used as a water outlet. The smaller flow rates and associated smaller pipes were found to be more cost effective than earlier systems that had very little storage and subsequently required larger pipes to carry large peak discharges during peak runoff periods. Riser intakes were later used to drain beef feedlots, and orifices of 1.59 cm (⅝ in) diameter or greater provided good flow control and were found to not readily clog with suspended solids or floating debris.

U.S. Pat. No. 5,820,751 issued Oct. 13, 1998 to Faircloth, Jr. describes a floating skimmer connected to a sediment basin outlet by a flexible outlet pipe. A single orifice is held at a shallow fixed depth below the water surface in a sediment basin. The orifice is subjected to a constant head, yielding a constant flow rate from the skimmer regardless of the stage within the basin. Although having a constant outflow simplifies the routing calculations defining the rate at which the runoff moves through the basin, basins utilizing a skimmer outlet must be made relatively large to detain larger storm events because they will generally drain much slower than they fill. Such a floating skimmer has several rotating parts that can be damaged by suspended or deposited sediments. Considering the muddy, gritty environment in which these devices operate, many components comprising the floating skimmer must work in unison for the skimmer to operate correctly. For example, the orifice assembly must be free to rotate as the water level increases or the discharge rate will be incorrect. Pivoting debris guards must be free to move or the single orifice could become clogged. Finally, the floating skimmer assembly must be free to raise and lower on the flexible hose attached at its base. If the skimmer becomes lodged in the muddy bottom of the basin, a large discharge rate of untreated water from the bottom of the basin would result. U.S. Pat. No. 4,015,629 issued Apr. 5, 1977 to Morgan et al. discloses an earlier adjustable flow floating weir assembly that may vertically adjust relative to liquid level in a basin. U.S. Pat. No. 4,517,091 issued May 14, 1985 to Yamanaka et al. provides for a swirling flow of liquid through a solids-liquid separator. More recently, U.S. Pat. No. 7,025,888, issued Apr. 11, 2006 to Thompson et al. provides a floating decanter for a basin which may prevent a drawing of floating solids or scum into a discharge outlet, functioning almost to the opposite effect of a skimmer.

Therefore, if an effective yet simple means were developed to increase the efficiency and ease of sediment retention within basins, this would be a valuable contribution and result in an improved, skimmer system that can be applied to drain a sediment or detention basin (hereinafter, a sediment/detention basin). Such a skimmer system oftentimes is asked to serve multiple purposes simultaneously, namely reducing peak discharge in a controlled, manner so as to reduce total suspended solids (TSS) or turbidity of the discharge. In addition, it would be advantageous if a skimmer system could: eliminate the need for moving parts, be less prone to failure or vandalism, be inexpensive to construct and install, have reduced maintenance, could accommodate variable discharge rates if desired, and if it contained its own secondary spillway, provide a water exit if the primary openings should clog.

SUMMARY

The above and other needs are met by a skimmer design that achieves the skimming function by providing two sets of vertically varied flow restricting devices placed in series with one another. "Sediment or Detention basin," or sediment/detention basin as used herein, is not intended to be limited to a stormwater basin, but may comprise any man-made or otherwise constructed pond, tank, reservoir, vessel or other basin containing a liquid-solid or liquid-liquid mixture from which it is desired to remove the lighter material while leaving the denser material in the basin "Downstream" as used herein refers to the direction that a fluid flows towards, and is the opposite of upstream. "Downstream," as used herein, does not connote any specific flow distance, only direction or relative location. "Impound" as used herein is used in terms of its scientific hydrology definition of retaining, for example, liquid in a reservoir, basin or pond where "basin" is used to encompass any such impounding of liquid.

In one embodiment, a sediment/detention basin drainage system includes a fluid drainage system within a basin for draining fluid from the basin while minimizing discharge of sediment from the basin. As used herein, a "conduit," or, more specifically, a riser, is a typically vertical, specially shaped or otherwise constructed means to control the discharge from a basin over a range of basin fluid levels to a basin outlet. The so-equipped conduit provides this control to regulate discharge of liquid from a basin to an outlet through any combination of weirs, apertures, orifices, or other flow regulating devices known in the art.

An embodiment of a fluid drainage system may include a first conduit having a substantially continuous sidewall and may be positioned vertically within the basin for contact with the fluid retained in a basin, the first conduit having at least one aperture or orifice through the sidewall thereof to allow liquid flow from the basin. A second conduit also may have a substantially continuous sidewall and be positioned downstream of the first conduit, the second conduit having at least one aperture through the sidewall thereof for connection to a basin drain or outlet. The diagrams following typically show the second conduit placed within the upstream first conduit, but this is only one possible configuration for placing the second conduit downstream of the first conduit. The first conduit may also be placed adjacent to the second conduit such that the second conduit is downstream of the first. The volume between the two conduits is sealed at the bottom, forming a flow regulating chamber.

A second conduit may be disposed within or adjacent to the first conduit or first conduit interior volume, the second conduit may have a top end open to atmospheric pressure and a bottom end opening to a drain or outlet. By being open at the top end to atmospheric pressure, the top of the second conduit may serve as its own secondary spillway. A plurality of orifices or apertures may be disposed in the second conduit wall between the top and bottom ends of the second conduit, the orifices being of approximately equal size and spacing or otherwise spaced or sized as described herein—the importance being that the liquid level in a chamber between the first and second conduit may rise and fall depending on expected liquid inflow rate. The liquid flows into this chamber from the basin through the apertures between the first and second conduits, and exits through the apertures in the second conduit to a drain in the second conduit. This drain is connected at the bottom end of the second conduit to carry the liquid flow to the ultimate basin outlet.

The apertures of the first conduit and second conduit of an embodiment are sized and arranged relative to one another to enable removal of fluid preferentially from the top of the water column within the basin, regardless of the water level within the basin. The plurality of apertures disposed in first conduit and downstream second conduit make two important contributions: 1) the apertures control the cumulative discharge flow rate from a basin, depending on the expected water level, within the basin, and 2) the aperture sizes in conjunction with the water level in the chamber control the flow rates through the apertures. As the water level in the basin increases, so does the water level in the chamber, which submerges the lower apertures of the first conduit, greatly decreasing their flow rate relative to the higher un-submerged apertures. This effectively shifts the majority of flow to the upper un-submerged orifices. Since both sets of apertures are properly sized and located to maintain the chamber water elevation at proper level in relation to the basin water level, the skimmer of this embodiment can perform at any water level in the basin.

In another aspect, the disclosure relates to a fluid skimming system for draining a basin having fluid and a denser solid (hereafter referred to as sediment), but could also be used for immiscible fluids of different densities or for a mixture of fluid and floating solids. In all cases, the goal of the design is to preferentially remove the less-dense material while retaining the denser. Since separation of immiscible fluids or fluid and solid of different densities will for the purposes of this design generally behave in the same way as sediment in water, the following discussion will for the sake of clarity focus solely on sediment in water. Because sediment is more dense than water, the sediment will fall through the water column such that the top of a water column will have a lower sediment concentration than the bottom. Therefore, preferentially skimming water from top of a basin filled with sediment laden water discharges relatively cleaner water. This has the effect of reducing Total Suspended Sediment (TSS) and reducing the turbidity of the discharge. Conversely, if a basin were tilled instead with a mixture of oil and water (or a fluid with floating, particles), the skimmer would still preferentially remove less dense fluid from the top of the fluid column, with the less dense material preferentially discharged.

In one embodiment, the first conduit and second conduit are both vertically oriented pipes, with the smaller second conduit placed within the first conduit. In this embodiment, the sidewall of the first conduit may be pierced by orifices gradually increasing in size from bottom to top, and the second conduit may be pierced by evenly-sized and spaced orifices from bottom to top, or there may be alternate configuration of orifices depending on preferred liquid flow rates as will be described below. The space between the two conduits is sealed at the bottom, forming a chamber. This configuration is generally similar to small or medium sized sediment/detention basin perforated riser outlet systems currently available, except that it has one extra vertical pipe and one extra set of apertures, and it preferentially removes water from the top of a basin.

In another embodiment, the first conduit forms a box-like chamber adjacent to a second conduit forming another adjacent box-like chamber, both boxes, for example, constructed of concrete, wood, or steel or other liquid containing and preferably non-polluting material in the instance when a liquid to be discharged is recyclable. In this embodiment, the first conduit may be pierced by orifices gradually increasing in size from bottom to top, and the second conduit may be pierced by evenly sized and spaced orifices from bottom to top, or there may be an alternate configuration of orifices depending on preferred liquid flow rates as will be described below. This configuration is generally similar to large sized sediment/detention basin perforated box outlet systems except it has an extra wall with apertures forming two boxes instead of one, and it preferentially removes water from the top of a basin.

In another embodiment, for either of the configurations described above, the multiple orifices of each of the first and second conduits may instead be replaced by a single large vertically continuous orifice or weir. In this manner, the flow of fluid through the skimmer is controlled by the weir hydraulics of the first and second conduits instead of by the multiple orifices or apertures.

In another embodiment, the apertures of the first and second conduits may instead be replaced by pipes of various diameters and lengths forming T-fittings. The system has smaller pipes emanating from the bottom and larger pipes emanating from the top (that act as first conduit apertures). These pipes join downstream through a network of T-fittings, and downstream from the T-fittings further flow restricting pipes act as a second conduit aperture, such that when the water level in the basin rises, the flow is restricted from the lower and smaller diameter pipes.

A secondary overflow system is generally required for sediment/detention basins to provide an alternate path for runoff in case of clogging of the orifices or other openings. An additional benefit of the several embodiments is that they can be designed in such a way as to contain their own secondary overflow system. In each of these embodiments, water can simply run from the basin over the open (to atmospheric pressure) top of the first conduit, filling the chamber, and then over the open top of the second conduit, allowing flow through the discharge pipe draining the second conduit.

Fluid drainage system embodiments according to the disclosure advantageously drain, for example, fluid or liquid from a top portion of the liquid in a basin while comparatively restricting drainage of liquid from the bottom portion of the liquid in the basin. The drainage system as described herein may be referred to as a Solid State Skimmer (SSS) because of the use of the first conduit and second conduit equipped with weirs, apertures or orifices and a chamber between the first and second conduit to control head and outlet flow with no moving parts. A brief description of the drawings will be followed by a detailed description of embodiments of an SSS and methods of draining a basin.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein:

FIG. 7(b) provides a depiction of Case 1 SSS first conduit discharge; FIG. 7(c) provides a depiction of Case 2 SSS first conduit discharge; and FIG. 7(d) provides a depiction of Case 3 SSS second conduit discharge.

DETAILED DESCRIPTION

The fluid flow rate (Q) through a single fully flowing orifice can be described mathematically by $$Q = C_d A \sqrt{2g\Delta h} \qquad (1)$$

where $C_d$ is a discharge coefficient (typically given as 0.61 for square shoulder orifices), A is the orifice cross-sectional area, g is the acceleration due to gravity, and $\Delta h$ is the difference in head across the orifice.

Figure 1:
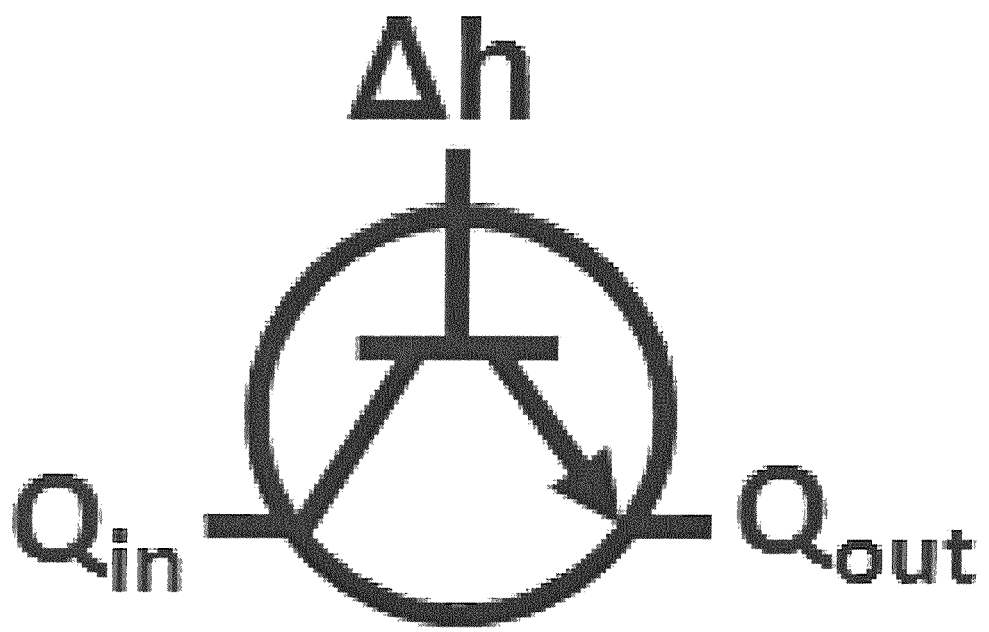
FIG. 1 shows a conceptual hydraulic transistor presentation analogous to one for an electronic transistor wherein $\Delta h$ represents the differential head (or difference in water levels) between a basin and the chamber fumed between the first and second conduits. This differential head controls the flow into the chamber ($Q_{in}$) and out of the chamber ($Q_{out}$), much as voltage applied to the center terminal of an electrical transistor controls the current running through the electronic transistor.

With reference first to FIG. 1, the "electronic" transistor shown, described hereafter as a hydraulic transistor, represents the analogy between a liquid skimmer function and the function of an electronic transistor. The $\Delta h$ represents the difference in water level (head) between the basin and the chamber ($b_b-h_c$) that exists across the apertures of the first conduit. This differential head or $\Delta h$ controls the flow (Q) into the submerged apertures of the first conduit per Eq. 1. Thus, if a chamber formed between a first and a second conduit fills up with liquid almost to the level of the basin, ($h_b-h_c$) becomes very small and the flow through the lower submerged apertures of the first conduit also becomes very small. Given a relatively small storage volume within the chamber between the two conduits, the flow into the chamber through the first conduit ($Q_{in}$) must equal the flow out of the chamber ($Q_{out}$) through the second conduit. The analogy between this hydraulic transistor and an electronic transistor is evident if one thinks of the water level within the chamber ($h_c$) acting as an electrical charge placed on the base of an NPN electronic transistor. If the base is positively charged (i.e., the chamber water level is high), then the electrical current through the transistor is not allowed (i.e., the water flow into the submerged orifices of the first conduit is greatly diminished). If the base is grounded (i.e., the chamber is empty or very low), then current flows through the transistor the water flow rate into the non-submerged or barely submerged orifices is high). Additionally, both the skimmer or hydraulic transistor and its analogy, the electronic transistor, are solid state as no moving parts are necessary for the "switching" between high and low flow rates. Hence, the embodiments of a sediment/detention drainage system may be referred to herein as a solid state skimmer or an SSS.

For large runoff events caused by heavy rainfall, it is desirable if discharge from a pond or basin be markedly less than the inflow into a pond or basin to reduce the risk of localized flooding. This requires a significantly sized detention pond or basin. In addition, increasingly strict water quality standards require removal of total suspended solids (TSS), and one of the more common ways of doing this is to form a basin in which the water is detained to allow sediment to settle. In practice, it is common for regulatory agencies to regulate the peak discharge from a pond or basin relative to multiple design storm intensities (e.g., the 24-hr 2-yr and the 24-hr 50-yr event). Given that (using the previous example) the 50-yr event is larger (more serious) than a 2-yr event, generally the regulatory agency will allow a larger discharge rate for the 50-yr event than the 2-yr event. Therefore, a pond or basin designed to meet both the 2-yr and 50-yr design storms can be made smaller if the design discharge rate increases with the volume of impoundment within the pond or basin. Such a design plan makes a discharge rate that varies with water level elevation a valuable asset for a basin outlet system to possess, as it can reduce the footprint of the basin.

Controlling a potential inflow basin hydrograph, such that the resulting outflow basin hydrograph occurs over a longer period of time, also promotes sediment retention and reduced turbidity. The theory is practiced by a basin inlet/outlet device (e.g., a weir, orifice, submerged pipe, and the like and combination thereof) such that as the impounded liquid (such as water) gets deeper, the more desirable it is to discharge the liquid at a high rate, and local codes generally allow for this. In the several disclosed embodiments, controlling $\Delta h$ as an individual lower aperture becomes submerged (see, for example, FIG. 6), is intended to decrease the flow rate into the submerged aperture of the first conduit. This reduces the discharge of liquid from the base of the column of liquid where the highest concentrations of TSS and highest turbidity are found, providing for more of the discharge to be from the upper un-submerged orifices, where the water column in the basin is clearer.

Based on the relationship of Eq. 1, the lower an orifice is located on a traditional riser (seen in cross-section, for example, in FIG. 6(a), the greater the flow from that orifice (for a given orifice area) and the greater the potential outflow of sediment as it settles down through the water column in the basin. In order to decrease the amount of flow from the lower orifices, one may reduce the $\Delta h$ acting on them, especially when the basin liquid level is high according to the hydraulic transistor theory of FIG. 1. As will be described with reference to a SSS embodiment of FIG. 2, this SSS embodiment provides pipes with three different diameters and T-fittings (which serve as hydraulic transistors) to accomplish the objectives of reduced sediment discharge and reduced turbidity.

Figure 2:
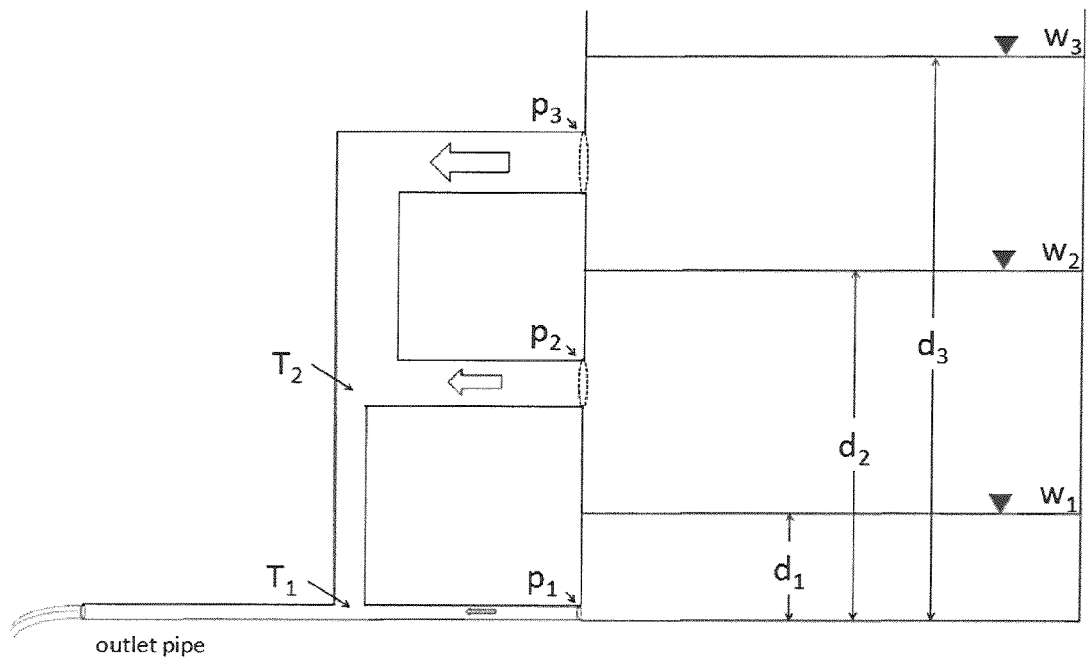
FIG. 2 provides a first embodiment of a sediment/detention basin drainage system whereby water input pipe diameters become increasingly greater with increasing elevation. In this embodiment, the depicted pipes and T-fittings (T1 and T2) function as hydraulic transistors analogous to the transistor of FIG. 1.
Figure 3:
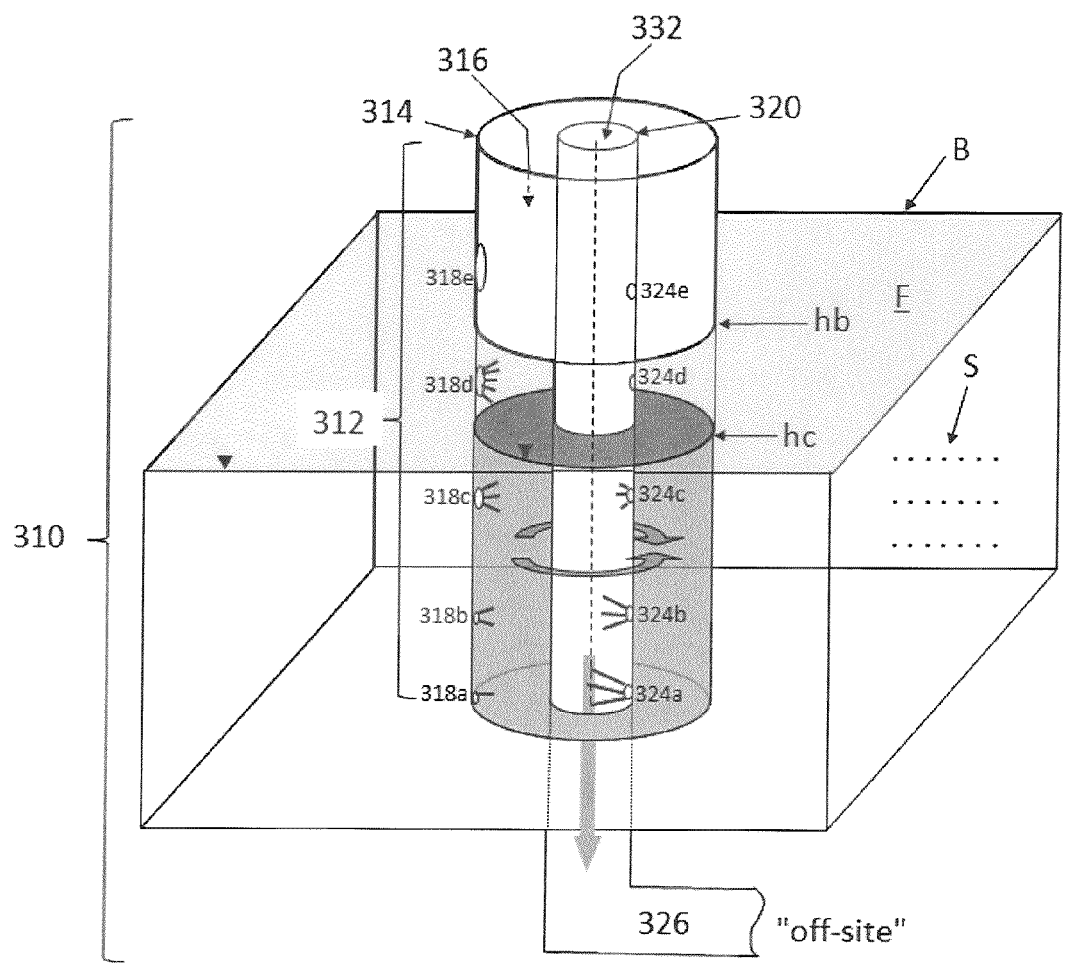
FIG. 3 provides a perspective view of a further embodiment of a sediment/detention basin drainage system having a first conduit and a second conduit according to the disclosure where the first conduit surrounds the second conduit.
Figure 4:
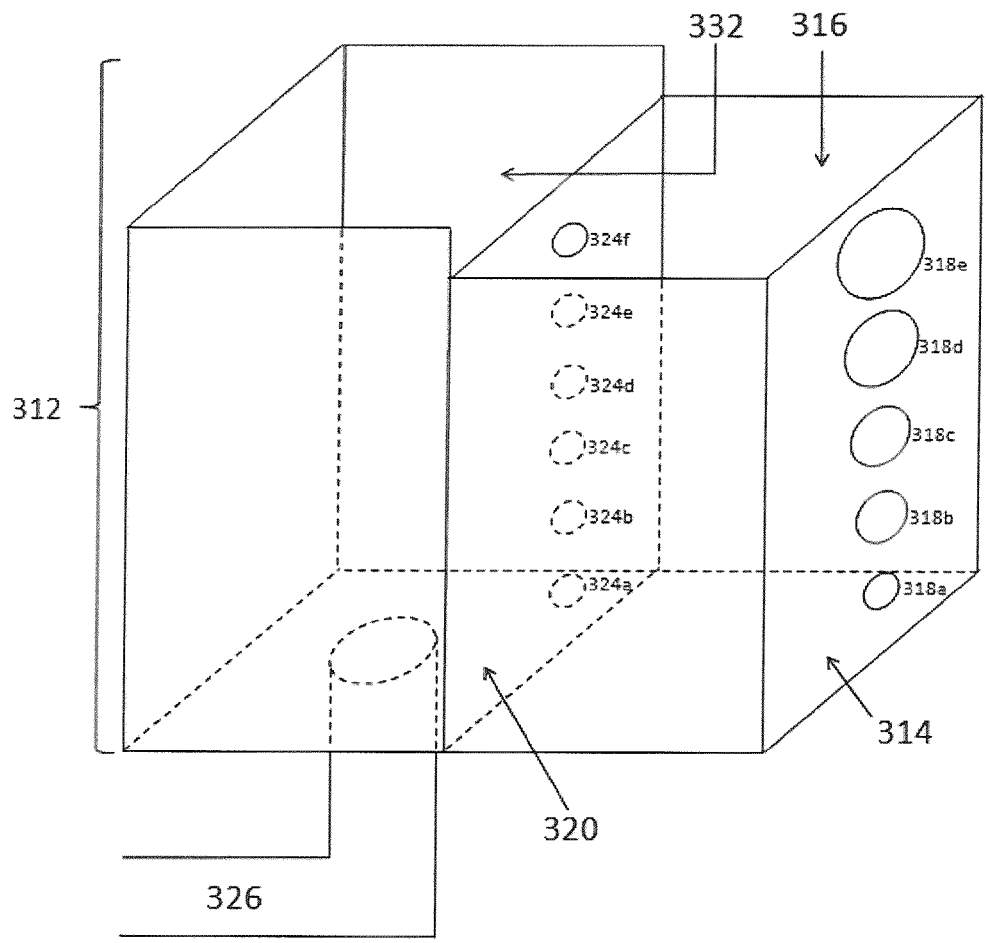
FIG. 4 provides a perspective view of a further embodiment of a sediment/detention basin drainage system wherein the first conduit comprise a box-like structure for receiving liquid from a basin and the second conduit comprises a further box-like structure, the second conduit placed downstream of the first conduit.
Figure 5:
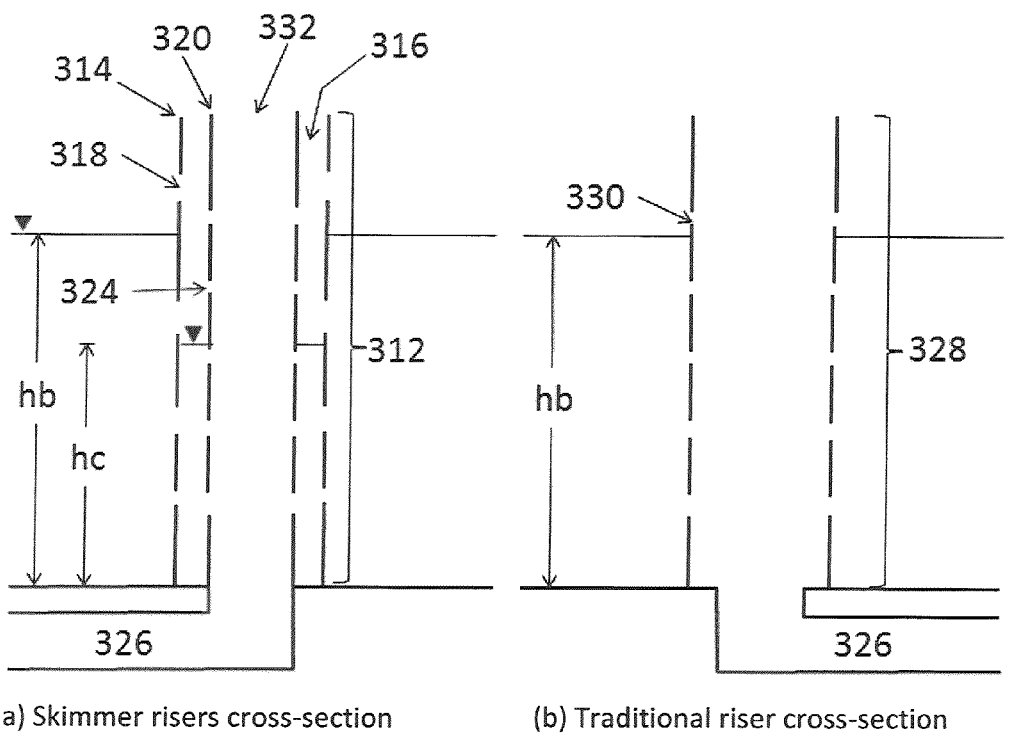
FIG. 5 is a cross-sectional view of the sediment/detention basin drainage system showing a comparison of heads (fluid levels) for an SSS (FIG. 5a) relative to a conventional or traditional riser (FIG. 5b).

With reference to FIG. 2, an SSS embodiment of a detention basin drainage system is shown having three pipes ($p_1$), ($p_2$), and ($p_3$) by way of example having three different diameters, pipe $p_3$ having the largest diameter. The diameters are progressively smaller as the pipes ($p_3$), ($p_2$) and ($p_1$) drain into a common line through T-fittings ($T_2$) and ($T_1$) respectively toward an outlet pipe shown at the bottom left of FIG. 2. Of course, this embodiment is merely exemplary, and more than three pipes may be used to drain a basin employing the hydraulic transistor principles of FIG. 1. An uppermost pipe ($p_3$) has a large diameter and meets at a T-fitting ($T_2$) with a medium diameter pipe ($p_2$) at a middle vertical position. Pipe ($p_2$) with the medium diameter meets a liquid flow from pipe ($p_3$) and a vertical pipe of similar diameter to pipe ($p_2$) to a small diameter pipe ($p_1$) at a further T-fitting ($T_1$). Liquid levels are shown having full-depth $d_3$, medium-depth $d_2$ and shallow-depth $d_1$. The embodiment of FIG. 2 may not serve as a secondary spillway (unless the uppermost pipe $p_3$ is directed upward to air (not shown). The embodiments of FIGS. 3-5 are shown having capacity to serve as their own respective secondary spillways through the open upper second conduits, as will be further described herein.

When the liquid depth in the basin is at low or shallow depth (for example, water level $d_1$), only inlet pipe ($p_1$) (small diameter pipe) carries flow, generating a low flow rate Q through the outlet pipe to the left of $T_1$. At this water level, the system behaves as a traditional riser would behave and hydraulic transistor ($T_1$) allows water to flow unimpeded.

When the liquid depth is at medium depth (water level $d_2$), both the lowermost pipe ($p_1$) and the medium depth and diameter pipe ($p_2$) carry flow. However, because the liquid can flow through the medium diameter pipe ($p_2$) with minimal head loss compared to flow through the smaller pipe ($p_1$), the head at T-fitting ($T_1$) increases. In essence, pipe ($p_2$) is minimizing the pressure gradient between the small diameter pipe ($p_1$) inlet and T-fitting ($T_1$), which greatly reduces the flow through pipe ($p_1$). Put another way, and following the analogy provided by the hydraulic transistor of FIG. 1, pipe ($p_2$) is applying "voltage" to the hydraulic transistor (T-fitting $T_1$), which reduces the "current", (i.e., liquid flow), from the pipe ($p_1$) inlet toward the outlet pipe at the left of $T_1$. What flow exits to the left of T-fitting ($T_1$) primarily originates mostly from pipe ($p_2$) because it is a larger diameter pipe with less resistance than pipe ($p_1$) to arrive at $T_1$. Although the inlet flow rate from pipe ($p_1$) has decreased by raising, the water level to $d_2$, the cumulative flow rate exiting the outlet pipe to the left has increased due to the higher head at T-fitting ($T_2$), so as to generate a medium flow rate.

When the liquid depth in the basin is deep (water level $d_3$), the same phenomenon occurs at T-fitting (hydraulic transistor) $T_2$ as at $T_1$ (with the respective elements), such that almost all the water flowing toward the outlet originates from largest diameter inlet pipe ($p_3$) and the flow rate is high, reducing the respective flow rates from the medium diameter pipe ($p_2$) and small diameter pipe ($p_1$). Because a hydraulic transistor is "solid state" and provides a control determined by pipe diameter size and vertical spacing between pipes ($p_1$) and ($p_2$), and pipes ($p_2$) and ($p_3$), the sediment/detention basin drainage system described herein is referred to as a solid state skimmer or SSS.

Referring to FIG. 3, a further embodiment of a sediment/detention drainage system (a SSS) is shown similar to the embodiment of FIG. 2, but, instead of individual T-fittings with different diameter pipes controlling the flow from each inlet toward an outlet, the T-fittings are represented by a single inner chamber between a first conduit 314 (or, more specifically, an inlet riser) upstream of a second conduit 320 (more specifically, an outlet riser) which, in this embodiment, is within or surrounded by the first conduit 314. As will be described with reference to the further embodiment of FIG. 3, the first conduit need not surround the second conduit; the second conduit must simply be downstream of the first conduit such that the first conduit and second conduit form a chamber 316. The chamber 316 of FIG. 3 is formed in the space between the first conduit 314 and the second conduit 320. Referring briefly to FIG. 2, the small diameter stub outlet pipe to the left of T1 in FIG. 2 is represented by the combination of orifices 324a-324e on second conduit 320 of FIG. 3. The different diameter inlet pipes ($p_1$), ($p_2$) and ($p_3$) of FIG. 2 are represented by the increasing orifice sizes of orifices 318a-318e from bottom to top on the outer vertical pipe or first conduit 314.

Referring further to FIG. 3 of the drawings, this farther embodiment of the disclosure relates to a sediment/detention basin drainage system 310 configured for installation within a sediment/detention basin B for draining fluid F from the basin B with reduced discharge of any sediment materials S. The SSS of FIG. 3 may consist of two concentric perforated risers: a first conduit 314 in contact with the mixed liquid and sediment in the basin on one side and the chamber (316) on the other side, and a second conduit (more specifically, an outlet riser) 320 in contact with the chamber (316) on one side and atmospheric pressure on the other. The conduits 314, 320 are shown rising from the bottom of basin B. For use in an agricultural setting, a conduit assembly according to FIG. 3 may be installed, for example, at the inlet of an agricultural pond drain at a desired pond depth. The first and second conduits 314, 320 are separated by a gap forming a chamber 316 having a small volume between the conduits. Water may flow into the chamber 316, open to atmospheric pressure, through orifices in the first conduit 314 and out of the chamber through orifices in the second conduit 320 before exiting the basin outlet to flow "off-site." The configuration of the orifices will cause the chamber 316 to partially fill when flowing, and so may create a submerged condition on one or more of the lower first conduit orifices, for example, orifices 318a-c with the chamber 316 level, $h_c$, shown. This causes the head on the submerged orifices, in this case, 318a-c to be the delta (difference in) head between the basin stage $h_b$ and the chamber stage $h_c$ as opposed to only that of the basin stage minus the orifice elevation, which in turn reduces the flow through the submerged inlet orifices.

FIG. 3 further shows the SSS in a basin B where quantity and length of the fluid flow lines from the orifices represent the cross sectional area and velocity, respectively, of the liquid flow jets emitted by each orifice. The volumetric flow rate is mathematically the product of the velocity and the cross-section area of the orifices. For example, the quantity of the flow lines at orifice 318d indicates greater liquid flow than the single line at orifice 318a. And likewise the liquid flow velocity at orifice 324a exceeds the liquid flow velocity at orifice 324c. Typically, the fluid F is stormwater and the sediment materials S are sediment, sludge, debris, soil, mud, vegetation, rock, trash, pollutants, and other solid materials eroded and entrained by stormwater and collected by the detention/sediment basin B.

While described in the context of drainage of stormwater from a detention pond or basin, it will be understood that the SSS structures described herein may be applicable to other fluids and systems as may be employed in chemical engineering, processing plants, and the like having combinations of immiscible fluids or fluid/solid mixtures, and the sediment/detention basin is intended to encompass practically any basin for retaining a fluid.

Referring briefly to FIG. 5(a), a SSS embodiment according to FIG. 3 is designed such that as the basin stage increases, the delta head between the basin B and the riser chamber (between the first and second conduits) or ($h_b$–$h_c$) remains small in a SSS, causing more orifices in the first conduit to become submerged and the discharge rate of those submerged orifices to decrease. Consequently, this requires an increase in the size of the upper first conduit orifices with increasing basin stage to accommodate the need for increased flow. At lower basin stages, the chamber 316 partially drains and un-submerges some of the lower orifices, so the lower orifices can then contribute more flow. This creates a situation where the majority of flow always discharges from the uppermost flowing orifices of the first conduit 314 regardless of the basin stage. By properly configuring the orifices on the conduits of the SSS, the lower submerged orifices of the SSS first conduit could experience, for example, just centimeters of head, while the lower orifices of a traditional riser (shown in FIG. 5(b)) under similar conditions would be subjected to a meter of head or more depending on the depth of water in the basin B. Since the flow through an orifice is directly proportional to the square root of head across the orifice, reducing head from a few meters to a few centimeters reduces the flow rate by approximately the square root of two orders of magnitude, or by a factor of 10.

Referring again to FIG. 3, the system 310 includes a fluid drain 326 within the basin B for draining at least portions of the fluid F from the basin B while minimizing discharge of the sediment S from the basin B, and offering improved function and ease of use as compared to traditional skimmers and riser systems used for draining basins.

The fluid drainage system 310 includes the first conduit 314 having a substantially continuous sidewall 312 and is positioned within or adjacent to the basin B for contact with the fluid F. First conduit 314 may be referred to, more specifically, as all inlet riser. The first conduit 314 includes a plurality of first apertures 318a-318e through the sidewall 312 generally of increasing size from bottom up. The conduit 314 is shown having a circular cross-section and extending substantially vertically upward from the bottom of the basin B. Many cross-sectional shapes are possible, including but not limited to square, rectangular, oval and the like and, for example, have any pointed side pointing into any liquid current flow as from a stream.

It will be understood that the second conduit 320 may also have a cross-section other than circular, such as rectangular, oval and the like, and be shaped differently from or the same as the first conduit 314. If desired, both the first conduit 314 and second conduit 320 may also be located at an orientation that is not substantially vertical. In addition, while the apertures 318a-318e are shown as substantially circular in cross section, vertically aligned with one another in a single column, substantially uniformly spaced, and increasing in diameter from bottom up, with the uppermost aperture 318e having the largest diameter and the lowermost aperture 318a having the smallest diameter, it must be understood that other arrangements and shapes of the apertures 318a-318e are acceptable if desired. What is important, as will be mathematically described, is controlling the head within the chamber 316 between the first and second conduits 314, 320 such that this head $h_c$ substantially reduces the flow through the submerged orifices of the first conduit 314.

A second conduit 320 having a substantially continuous sidewall (not specifically identified) may be positioned within the first conduit 314 to form chamber 316. The second conduit 320 includes a plurality of second apertures 324a-324e through the sidewall. As shown, the apertures 324a-324e may represent a flow area that is substantially smaller than the flow area represented by the first conduit apertures 318a-318e.

The second conduit 320 is shown having a circular cross-section and extending substantially vertically upward from the bottom of the basin B. It will be understood that the conduit 320 may have a cross-section other than circular and may also be located at an orientation that is not substantially vertical if desired but in substantial conformity with the cross-section chosen for the first conduit 314. Likewise, this riser does not require placement within first conduit 314 so long as it is connected hydraulically downstream and has a configuration so as to establish a chamber head, $h_c$. In addition, the apertures 324-324e are shown to be substantially circular in cross section, vertically aligned with one another in a single column, substantially uniformly spaced, and substantially equal in diameter, with the uppermost aperture 324e having an equal diameter with the lowermost aperture 324a. Aperture 324a is shown having the largest water flow to a basin outlet 326 and aperture 324e, the highest submerged aperture of second conduit 320, has the smallest water flow toward outlet 326. It will be understood that other arrangements of the apertures 324a-324e are acceptable if desired.

Also, the apertures 324a-324e are shown to be located substantially in-line with the apertures 318a-318e, respectively, that is, aperture 324a aligned with aperture 318a, and likewise on up, and oriented to be substantially 180 degrees out of phase with one another so that the line of the apertures 324a-324e is oppositely facing than the apertures 318a-318e. This orientation of orifices around the perimeter of the conduit is optional and does not affect the flow of liquid through the system as the chamber 316 formed between the two risers may be designed to be large enough to transmit any reasonable flow with minimal loss of head. It will be understood that the apertures may be otherwise oriented around the perimeter, and the apertures 324a-324e may optionally face or be at any other angle to apertures 318a-318e.

Also, as seen in FIG. 5, additional sets of the apertures may be provided, with FIG. 5 showing four spaced apertures 318 on inlet 314 and five spaced apertures 324 on outlet 320 that are not spaced across from one another. The apertures need not be equal in number on inlet and outlet per unit depth. Likewise, the apertures need not be discrete openings, but may comprise a single tall aperture of proper width as a function of height, as shown with reference to FIG. 8.

Referring further to FIG. 3, a basin outlet 326 is provided in flow communication with the second conduit 320 for draining fluid F from the basin B to off-site via the fluid drainage system 310. Basin outlet 326 may carry sufficient flow capacity such that the outlet side of the bottommost orifice 324a remains un-submerged even during high flow conditions. The apertures 318a-318e and 324a-324e of the first and second conduits, respectively, are sized and arranged relative to one another to enable removal of fluid F from the basin B via the drainpipe 326 while providing flow conditions which inhibit the entry of the sediment S into the fluid drainage system 310 so as to maximize the retention of the sediment S within the basin B.

In order to control outflow while maximizing sediment retention, the flow area represented by the first apertures 318 and the flow area represented by the second apertures 324 are each configured to allow more fluid flow from upper portions of the fluid F, (for example, via upper aperture 318d of first conduit 314), than from the bottom orifice 318a thereof. Referring briefly to FIG. 5(a), this results in a fluid level ($h_b$) outside the first conduit 314 that is higher than a fluid level ($h_c$) in the chamber 316 between the first and second conduits. As shown in FIG. 5(b), a traditional single riser having a plurality of equal sized, equally spaced apertures along its length does not enable this fluid level differential. The head is represented by the fluid height ($h_b$) above each aperture.

Accordingly, the detention basin drainage system 310 or SSS enables removal of fluid from the basin B, while reducing sediment discharge as compared to traditional rise devices (for example, FIG. 5(b)). In addition, the construction of the system 310 results in a system that eliminates the need for moving parts, is less prone to failure, is inexpensive to construct and install, has reduced maintenance, accommodates variable flow rates, and has its own secondary overflow system.

A further embodiment of a detention drainage system is shown in FIG. 4 using similar reference numerals from FIG. 3 to denote similar elements. First conduit 314 is adjacent to and forms a chamber 316 with second conduit 320 which are box-like in shape and may be formed of concrete to reduce the threat of vandalism. Orifices of increasing size 318a-318e from bottom to top of vertical first conduit 314 receive liquid from the basin. The top of second conduit 320 may be open and serve as its own secondary spillway 332 for the basin. Outlet orifices 324a-324f are shown of approximately equal size and equal spacing along a wall of second conduit 320, but may be configured in various configurations such that $h_c$ is maintained at an appropriate level to submerge the lower inlet conduit apertures. No water levels are shown in FIG. 4, but the same mathematical principles apply to providing a hydraulic transistor at each orifice stage of first/second conduits so that a regulated flow is achieved and sediment retention in a basin is maximized. The maximum differential head will be $h_b-h_c$, where the basin and chamber 316 water levels are not shown.

One of many possible routes for solving the mathematics of sizing and placing the apertures for a SSS will be further discussed, with an emphasis on explaining the operation of the SSS.

Eq (1) describes only conditions when an orifice is flowing fully, with the upstream water elevation above the top of the orifice. A partial flow condition can also occur in which the orifice behaves more like a weir, with a portion of the orifice not flowing fluid. This partial flow condition can be described by the functions $$Q(H, \Delta h) = \begin{cases} 0 & H < z_{inv} \\ CL_w H^{3/2} & z_{inv} < H < D + z_{inv} \\ C_d A \sqrt{2g\Delta h} & H > D + z_{inv} \end{cases} \quad (2)$$

$$\text{for } \frac{H}{D} < 0.5; L_w = D\sin\left(\frac{\theta}{2}\right) \quad \text{where } \theta = 2\arccos\left(1 - \frac{2H}{D}\right) \quad (3)$$

$$\text{for } \frac{H}{D} \geq 0.5; L_w = D$$

where $z_{inv}$ is the orifice invert elevation and H is the height of water above the orifice invert, not to be confused with h.

Continuous Riser Discharge

Figure 6:
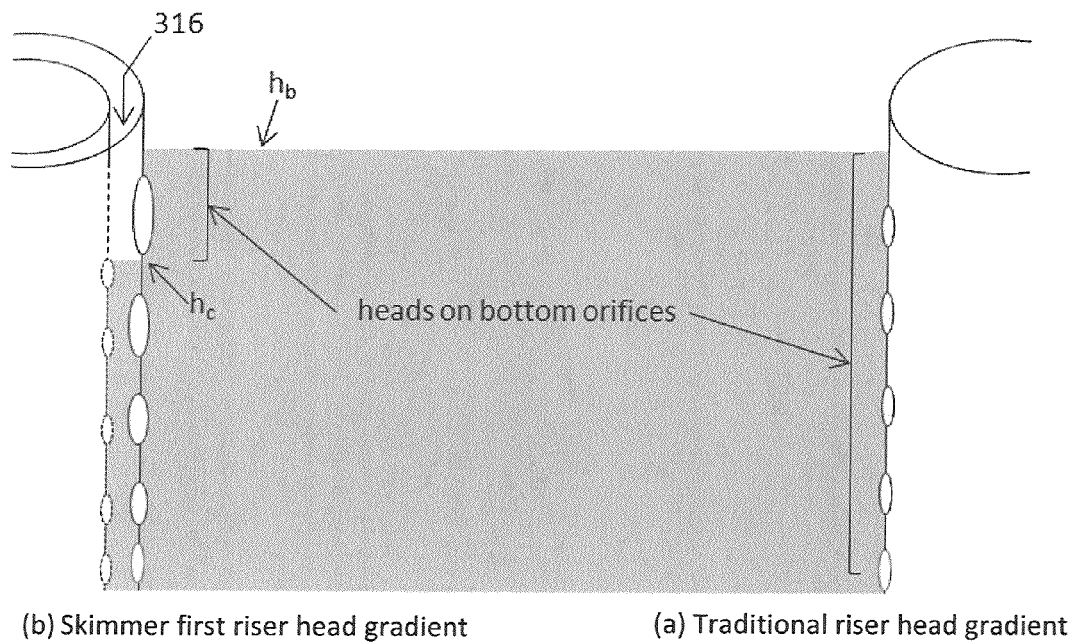
FIG. 6 provides a depiction of the difference in heads at equal basin fluid levels for an SSS (FIG. 6a) and a traditional riser (FIG. 6b). At an equal basin water level ($h_b$), the differential head driving flow through the lower orifices is markedly reduced in the SSS design (i.e., $h_b$, $-h_c \ll h_b$).

FIG. 6 illustrates the difference in head between a SSS (FIG. 6a) and a traditional riser (FIG. 6b) placed side by side in a basin filled to level $h_b$. Then, a comparison of the head acting on the lowest orifice of the SSS ($h_b-h_c$) is compared that of the traditional riser ($h_b-z_{inv}+0.5$ D)

FIGS. 7(a) to 7(d) show the flow regime of the traditional riser, and the three flow regimes (Case I, II, and III) for flow within a SSS riser, where h is the basin B stage, $h_c$ is the chamber stage (chamber between first and second conduits), and z is the elevation above the basin floor or a pond drain. FIG. 7(a) shows a traditional riser discharge. Case I or FIG. 7(b) occurs when the first conduit discharges to atmospheric pressure, indicated by an upper orifice with a horizontal line to air. Case II or FIG. 7(c) occurs when the second conduit discharges to a submerged chamber, wherein two submerged orifices are shown with horizontal lines to fluid. Case III or FIG. 7(d) occurs when the second conduit discharges to atmospheric pressure indicated by two orifices of the second conduit exposed to atmospheric pressure (air) having horizontal lines to air.

Figure 8:
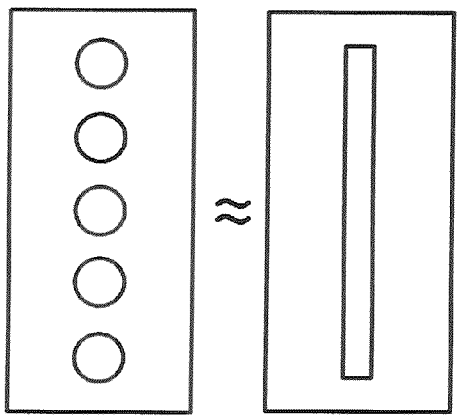
FIG. 8 provides further alternative SSS embodiments, for example, therein the first and second conduits both contain a single continuous aperture or weir instead of a plurality of smaller apertures; wherein, for example, the second conduit FIG. 8(a) may be provided with a rectangular slot that approximates equally spaced and equally sized apertures and FIG. 8(b) may provide an example of a first conduit with a single weir shaped aperture that approximates a plurality of orifices whose sizes increase with elevation.
Figure 8:
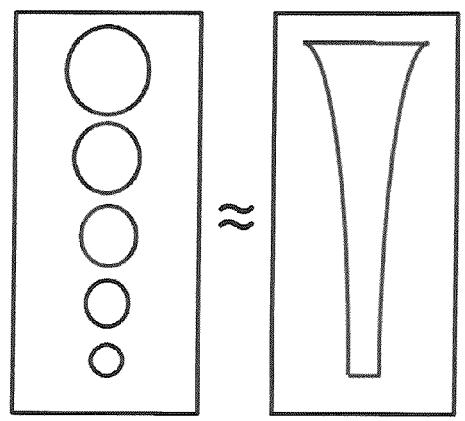

FIG. 8(a) shows a replacement of a plurality of equal size, equally spaced orifices of the second conduit, for example, replaced by a single rectangular slit to limit flow to an outlet. Similarly a series of graduated sized orifices small to large from bottom to top of the first conduit may be replaced per FIG. 8(b) with a graduated V shaped slit. In this manner, there is a continuous control of the flow in and flow out of a chamber between second and first conduits. FIG. 8 thus may be applied in any of the embodiments, for example, of FIGS. 3 and 4 of a detention basin drainage system. Now the mathematics will be further described.

Figure 7:
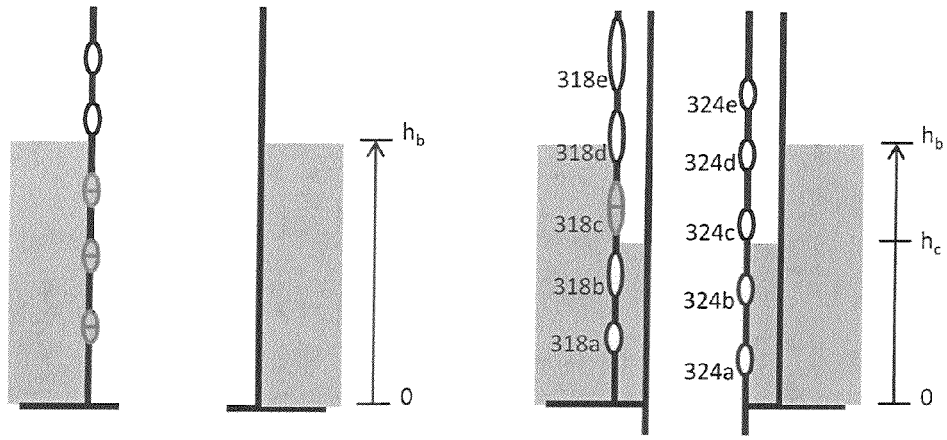
FIG. 7 provides flow regimes for a traditional riser and for each of three cases of SSS discharge wherein FIG. 7(a) provides a depiction of traditional riser discharge.
Figure 7:
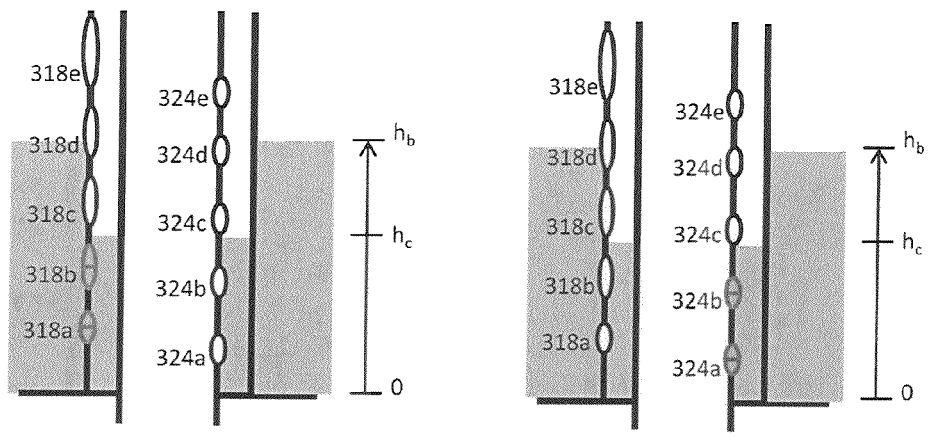

The traditional riser (FIG. 7(a)) is similar to Case III (FIG. 7(d)), but the head is driven by $h_b$, not $h_c$. The four $\Delta h$ zones are described by $$\Delta h(z) = \begin{pmatrix} \Delta h_{trad} = h_b - z \\ \Delta h_I = h_b - z \\ \Delta h_{II} = h_b - h_c \\ \Delta h_{III} = h_c - z \end{pmatrix}; \begin{pmatrix} 0 < z < h_b \\ h_c < z < h_b \\ 0 < z < h_c \\ 0 < z < h_c \end{pmatrix} \quad (4)$$

where the trad, I, II and III subscripts describe the traditional riser and the three Cases of SSS flow, respectively depicted in FIG. 7.

The general equation for discharge from a vertical riser with a continuous distribution of orifice area is given by $$QC = \int C_d \left[\frac{d}{dz}A(z)\right] \sqrt{2g\Delta h(z)} \, dz \quad (5)$$

where A(z) describes a continuous orifice area distribution. For a traditional riser with orifices of constant spacing and diameter, the continuous area distribution can be approximated by $$A(z)_{trad} = a_{trad} \quad (6)$$

where $a_{trad}$ describes the width of a rectangular weir (FIG. 8(a)) equivalent to a plurality of orifices of constant spacing and diameter. The solution for such a traditional riser is found by substituting Eq. 6 into Eq. 5

$$QC_{trad} = C_d \sqrt{2g} \int_0^{h_b} \frac{d}{dz}(a_{trad} z)\sqrt{h_b - z} \, dz \quad (7)$$

followed by integration to yield $$QC_{trad} = \frac{2}{3} C_d a_{trad} \sqrt{2g} \, h_b^{3/2} \quad (8)$$

As previously mentioned, the Case III flow is similar to the traditional riser, but with the head defined by $h_c$, not $h_b$. By letting the Case III area distribution be described by $$A(z)_{2nd} = a_{2nd} z \quad (9)$$

where $a_{2nd}$ describes the width of an equivalent rectangular weir, the Case III continuous discharge is given by $$QC_{III} = \frac{2}{3} C_d a_{2nd} \sqrt{2g} \, h_c^{3/2} \quad (10)$$

which is identical to Eq. 8. with the exception of the head term. Of course other versions of the area distribution (i.e., Eq. (9)) would result in different outcomes for Eq. (10).

Because discharge into the chamber is reduced due to a submerged condition of the lower first-conduit orifices, the first conduit aperture area distribution, $A(z)_{1st}$, should increase with elevation in order for the flow rate to increase with basin state. One may use the second order polynomial $$A(z)_{1st} = a_{1st}z + b_{1st}z^2 \quad (11)$$

where $a_{1st}$ describes the width at the base of a weir and $b_{1st}$ describes the exponential growth of the weir width with increasing z (FIG. 8(b)), although other versions of Eq. (11) could be considered. To derive the Case I and Case II continuous area flow equations, Eq. 11 was substituted into Eq. 5 using the definitions of $\Delta h(z)$ provided by Eq. (4). The result was then integrated through the limits of z also defined in Eq. (4) to arrive at $$QC_I = C_d\sqrt{2g}\left(\frac{2}{3}a_{1st} + \frac{8}{15}b_{1st}h_b + \frac{4}{5}b_{1st}h_c\right)(h_b - h_c)^{3/2} \quad (12)$$

$$QC_{II} = C_d\sqrt{2g}\,(a_{1st}h_c + b_{1st}h_c^2)\sqrt{h_b - h_c} \quad (13)$$

Optimization of Design Parameters $a_{1st}$, $b_{1st}$, and $a_{2nd}$

Figure 9:
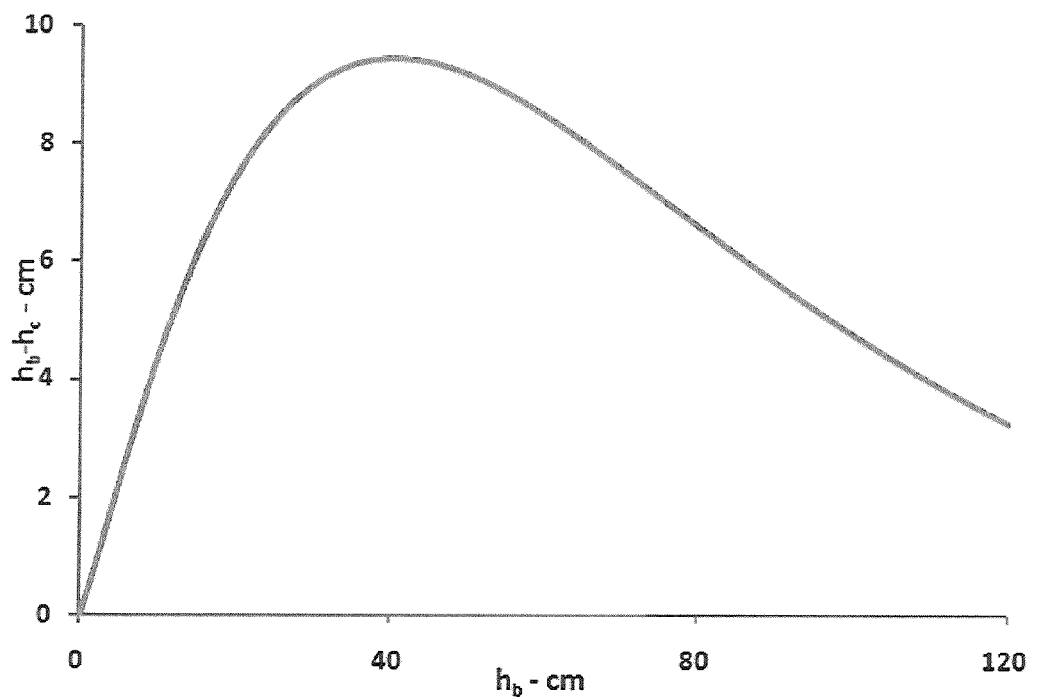
FIG. 9 provides a graph of a target function (gamma distribution) used to describe a possible preferred target for difference between the basin and chamber water levels ($h_b-h_c$) as a function of the basin water level ($h_b$) in centimeters. The gamma distribution is but one of many potential target functions that could be selected for this relationship, depending on the desired outflow rate characteristics.

Designing a SSS to match a desired stage-discharge-curve requires estimates for parameters $a_{1st}$, $b_{1st}$, and $a_{2nd}$. Unfortunately, the solution is non-unique since it can be accomplished with differing amounts of $(h_b - h_c)$ as a function of $h_b$. Therefore, this desired relationship must be selected a priori. As $(h_b - h_c)$ is minimized, the skimming function of a SSS is enhanced, but at the cost of increasing the size of A(z). One may chose to use the gamma distribution to relate $(h_b - h_c)$ and $h_b$ as follows $$(h_b - h_c) = \lambda^\eta h_b^{\eta-1}\frac{\exp(-\lambda\eta)}{\Gamma(\eta)} \quad (14)$$

where $\lambda$ and $\eta$ are gamma distribution fitting parameters and $\Gamma(\eta)$ is the gamma function. Values for $\lambda$ and $\eta$ must be selected a priori to achieve a desired $h_b$ versus $h_c$ relationship (FIG. 9). This function allows $(h_b - h_c)$ to increase quickly with increased $h_b$ up to a reasonable value (i.e., several cm's) and then reduce as the basin fills further. This reduction of $(h_b - h_c)$ as the basin continues to fill leads to increasingly higher percentages of flow exiting from the top of the water column within the basin.

Once $\lambda$ and $\eta$ have been selected, $a_{1st}$, $b_{1st}$, and $a_{2nd}$ must be optimized such that the predicted discharge of the SSS may match a desired stage discharge curve $(Q_D)$. Continuity dictates that $$QC_I + QC_{II} = QC_{III} \quad (15)$$

for all $h_b$. Through a process of least squares optimization, $a_{1st}$, $b_{1st}$, and $a_{2nd}$ can be simultaneously fit by optimizing $$\{QC_I(h_b) + QC_{II}(h_b) - Q_D(h_b)\}^2 \approx \{QC_{III}(h_b) - Q_D(h_b)\}^2 \Rightarrow 0 \quad (16)$$

In practice, one may optimize $a_{1st}$, $b_{1st}$, and $a_{2nd}$ using the Microsoft Excel Solver Tool and the following numerical scheme $$\sum_{h_b=0}^{h_{b-max}} [QC_I(h_b) + QC_{II}(h_b) - Q_D(h_b)]^2 \cong \quad (17)$$

-continued
$$\sum_{h_b=0}^{h_{b-max}} [QC_{III}(h_b) - Q_D(h_b)]^2 \Rightarrow 0$$

where $h_{b-max}$ is the maximum $h_b$ value for the pond being considered and each subsequent iteration of $h_b$ is slightly larger than the previous until the entire range is spanned, $QC_I$, $QC_{II}$, and $QC_{III}$ are defined by Eqs. 12, 13, and 10, respectively, and $h_c$ is calculated from Eq. (14).

Orifice Placement on Risers

Translating A(z) into discrete orifices first requires an assumption of the sizes of orifices desired in the first and second conduits. These orifice sizes will be dictated by the desired discharge and number of desired orifices. Starting with the smallest desired orifice area and assigning it to the lowest orifice area interval, $A(z)_1$, the elevation at the top of this interval, $z_1$, can be calculated by first defining the lowest orifice interval as (using the second conduit as an example)

$$A(z)_{2nd_i} = a_{2nd}z_{2nd_i} - a_{2nd}z_{2nd_{i-1}}; i = 1 \ldots n \quad (18)$$

where $z_0 = 0$. Solving for $z_i$ $$z_{2nd_i} = \frac{A(z)_{2nd_i} + a_{2nd}z_{i-1}}{a_{2nd}}; i = 1 \ldots n \quad (19)$$

Eq. (18) is applied n times, until z approaches $h_{b-max}$. Each $z_i$ dictates the elevation that separates the A(z) into sections that will each be represented by a single orifice. In practice, it is helpful to increase the orifice sizing with increasing z to limit the number of orifices on the first conduit.

After an array of z values is calculated for the first and second conduits, the centroids of A(z) between each $z_i$ is determined. These centroids will be used to locate the center of the orifices and can be calculated from $$\bar{z}_i = \frac{\int_{z_{i-1}}^{z_i} z\frac{d}{dz}(A(z)_i)dz}{\int_{z_{i-1}}^{z_i} z\frac{d}{dz}(A(z)_i) - 0dz}; \quad i = 1 \ldots n \quad (20)$$

which gives a trivial solution for the second conduit $$\bar{z}_{2nd_i} = \frac{z_i + z_{i-1}}{2}; i = 1 \ldots n \quad (21)$$

since the shape of $A(z)_{2nd}$ is rectangular. The solution for the inlet orifice is more complex $$\bar{z}_{1st_i} = \frac{\frac{2}{3}b_{1st}(z_i^3 - z_{i-1}^3) + \frac{1}{2}a_{1st}(z_i^2 - z_{i-1}^2)}{a_{1st}(z_i - z_{i-1}) + b_{1st}(z_i^2 - z_{i-1}^2)}; i = 1 \ldots n \quad (22)$$

Numerical Flow Equations

The analytical prediction of flow given by Eq.'s (10, 12, and 13) above, are based on the optimization of Eq. 16, which will generally have some error remaining following optimization, and therefore so does the estimate of flow. If a more accurate estimate of flow is desired, in order to validate Eqs. (10, 12, and 13) and the optimization procedure for $a_{1st}$, $b_{1st}$ and $a_{2nd}$, the water can be routed through the orifices using Eqs. (2 and 3). Because, for example, with the embodiments of FIGS. 3, 4 and 5, the first and second conduits of a SSS are placed in series (of water flow downstream), the cumulative inflow through the first conduit orifices must be simultaneously solved along with the cumulative outflow through the second conduit orifices, while ensuring that $h_c$ (a head term common for both the first and second conduit orifices) is consistent across the full range of $h_b$. This requires an iterative solution for $h_c$ to balance the flow through the inlet and outlet orifices for each $h_b$ solution desired. One may solve Eqs. (2 and 3) for $h_c$ iteratively using the Excel Solver subroutine.

Methods of Operation of a SSS

Test Apparatus

A test basin B for a small field-scale test consisted of a commercially available above-ground swimming pool, nominally 4.6 m diameter by 1.2 m deep with a volume of 19,000 L. After placing and assembling the pool, the pool was slightly elliptical with major ($D_M$) and minor ($D_m$) chords of 4.4 m and 4.3 m, respectively. A stage-storage curve was developed for the trial basin based on the elliptical area, $A_E$ as follows $$A_E = \frac{\pi D_M D_m}{4} \quad (23)$$

Figure 10:
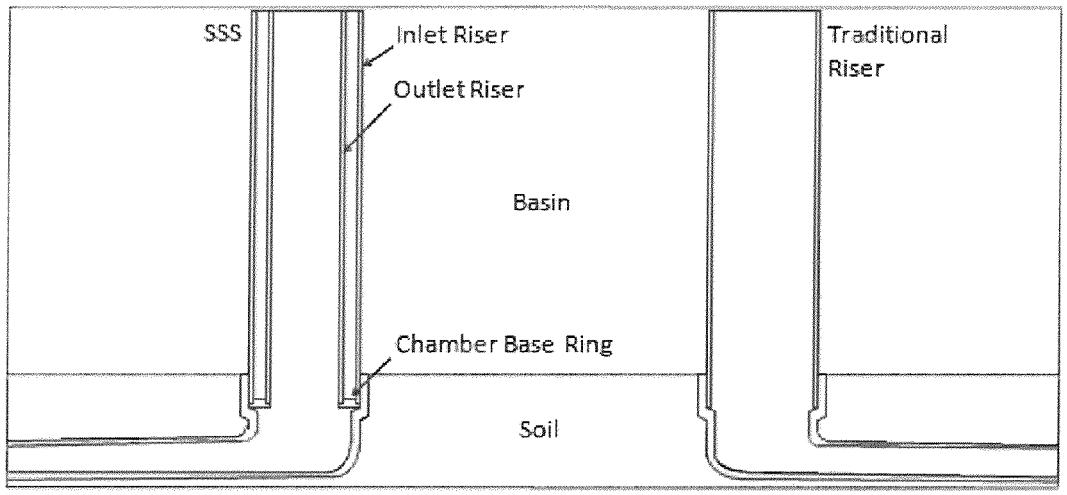
FIG. 10 shows a SSS (FIG. 10a) and a traditional riser (FIG. 10b) in a side-by-side trial conducted for comparative testing. The apertures are omitted in the drawing for clarity.

Prior to placing the test basin, two trenches were dug in the underlying soil to accommodate a drainage conduit for each of two outlets, one for an embodiment of a SSS (FIG. 10(a)) and one for a Traditional Riser (FIG. 10(b)). The ultimate drainage conduits consisted of a 10-in schedule 40 PVC elbow coupled to a 3-in schedule 40 PVC drain pipe (FIG. 10), which discharged to a nearby pit. A hole was then cut in the basin floor at each elbow to accept the SSS and Traditional riser pipe. The Traditional riser pipe consisted of a 10-in schedule 40 PVC pipe. Since the SSS riser required that pipes be installed with a seal at the base of the chamber, a PVC base ring with two concentric grooves was fabricated to accept the 10-in schedule 40 PVC first conduit and a 6-in schedule 40 PVC second conduit (FIG. 10(a)). The base ring forming the riser chamber floor had a 15.2 cm hole in its center to allow outflow from the second conduit into the elbow beneath. The traditional and SSS risers were secured into the couplers using rubber gasket compound to create a water-tight seal. The holes in the basin floor were sealed by packing bentonite clay around the base of the risers and securing a plastic apron to the risers on top of the bentonite seal.

Riser Designs

The orifice pattern for the Traditional riser was arbitrarily selected as twelve (12) 1.59 cm orifices at a 10 cm spacing interval. Flow through the Traditional riser was calculated using Eq.'s 2 and 3. The predicted discharge from the Traditional riser was then set as the $Q_D$ for the SSS design, so that both the Traditional and SSS risers would discharge the same flow rates for all $h_b$. For the present study, we set $\lambda = 2.2$ and $\eta = 1.1$, which led to a maximum ($h_b - h_c$) of 9.4 cm occurring at a $h_b$ of 40 cm. With the $Q_D$ from the Traditional riser and the desired ($h_b - h_c$) from Eq. (14), using Eq. (16) we found that $a_{1st} = 0.0423$, $b_{1st} = 0.0055$, and $a_{2nd} = 0.2251$.

For the purpose of testing equivalent systems, the same orifice size (1.59 cm) was selected for the second conduit, which led to having 12 equally spaced orifices for the second conduit of the SSS of FIG. 10a. Four orifice sizes were provided for the first conduit, beginning at the bottom with one (1) 1.59 cm orifice, three (3) 1.9 cm orifices, five (5) 3.2 cm orifices, and finally three (3) 3.8 cm orifices at the top of the first conduit of the SSS of FIG. 10(a).

Testing Procedures

One riser at a time (first Traditional, then SSS) was tested for flow rate as a function of $h_b$. The orifices for the non-tested riser were temporarily sealed when not being tested. After filling the test basin, the drop in basin water level ($dh_b$) per time interval ($dt$) was measured with a meter stick and stopwatch to allow for calculation of the measured discharge rate ($Q_{meas}$) throughout the range of $h_b$.

$$Q_{meas(Trad,SSS)} = A_E \frac{dh_b}{dt} \quad (24)$$

After completing the measurement of both stage discharge curves, these two curves were compared against one another, and the SSS measured stage discharge curve was also compared to the predictions from both the analytical (Eq. 10) and numerical prediction for the SSS riser (Eq.'s 2, 3, and 4).

The sediment retention efficiency of the SSS was evaluated by comparing the turbidities of water discharged from the above-described SSS and Traditional riser installed in parallel in the test basin as discussed above. Because both systems were installed in parallel so that they were operating at the same time, each was subjected to the same set of conditions for each of four tests. Tests consisted of routing a design storm hydrograph and associated sediment through the reservoir.

In order to define a design storm inflow rate, we used the National Resources Conservation Service (NRCS) dimensionless unit hydrograph method. The total volume routed through the reservoir for each of four tests was 45,000 L. The University of Tennessee's hydraulics laboratory is equipped with tanks from which water can be pumped at a desired flow rate using a computer-controlled flow-control valve, creating a device termed the "hydrograph generator." Using such a hydrograph generator device, we pumped the design storm hydrograph to the test basin.

To calculate the mass of sediment likely to be carrier by a storm of the size required to produce the runoff volume defined above, we implemented a modification of the Revised Universal Soil Loss Equation (RUSLE). Using a sandy clay loam, we determined the sediment yield for the design storm event. This mass of soil was prepared for the tests by mixing it with water in 5-gallon buckets at least twelve hours before testing. Then, just prior to the test, all the buckets were mixed again. A mixed water-soil slurry was added to the basin inflow stream on as volumetric basis.

For each test, twenty-eight (28) paired effluent samples were collected from the outlets of the two systems on an outflow volumetric basis. Turbidity was measured for each of the twenty-eight paired samples collected from each of the four tests using a Monitek CST06825 Model 21 Nephelometer optical turbidity meter. Statistics were performed on the sediment retention data to show whether the SSS significantly decreased the turbidity of the discharge from the basin. Using the SAS v9.2 univariate procedure, the experiment was defined as a random block design with significance set at $\alpha = 0.05$.

Results

Measured Versus Modeled Discharge

Figure 12:
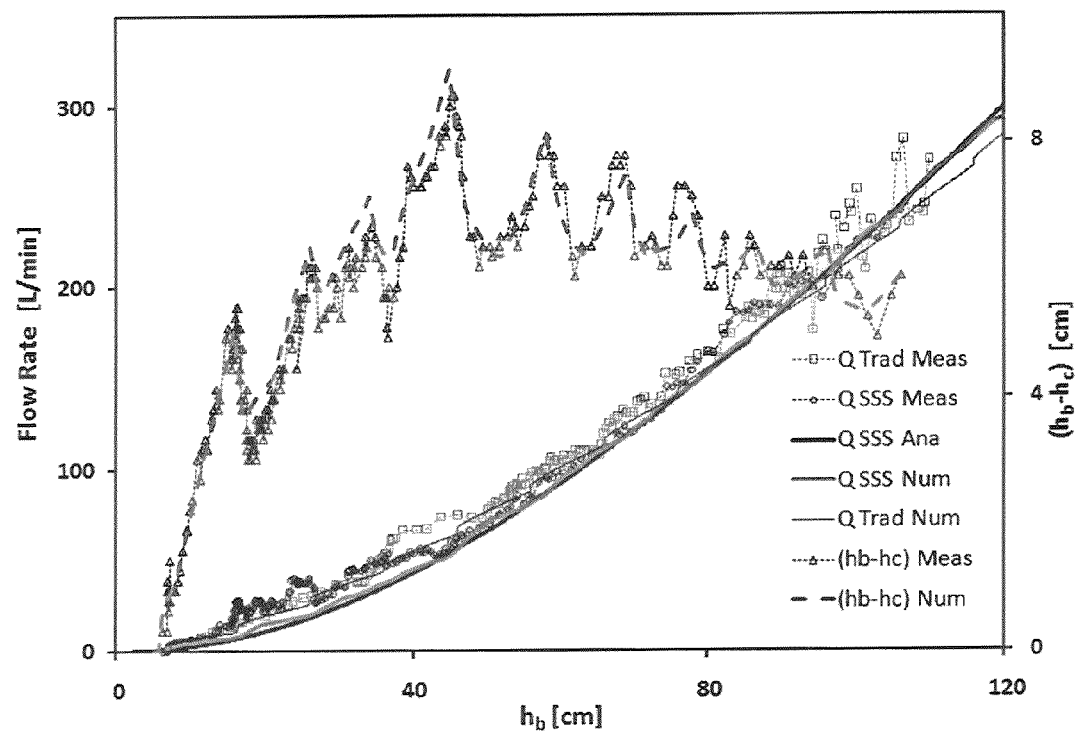
FIG. 12 shows several measured and calculated estimates of flow rate versus $h_b$ for the Traditional riser and the SSS.

FIG. 12 shows several measured and calculated estimates of flow rate versus $h_b$ for the Traditional riser and the SSS. All of these measurements and estimates are quite similar, indicating the validity of the method described above to size and locate the orifices. Q-Trad-Meas and Q-SSS-Meas are from direct measurements of flow rate of the Traditional and SSS risers, respectively, using a meterstick and stopwatch. Q-SSS-Ana is the analytical prediction of flow rate for the SSS (Eq. 10). Q-Trad-Num and Q-SSS-Num are the numerical predictions of flow rate for the Traditional and SSS risers, respectively (Eqs. 2, 3, and 4). Values of $(h_b-h_c)$-Meas are direct measurements of $(h_b-h_c)$ using a meterstick, and values of $(h_b-h_c)$-Num are the numerical solution for $(h_b-h_c)$ (Eq.'s 2, 3, and 4); these two plots are read off the right vertical axis and are very similar. The jagged nature of the $(h_b-h_c)$ lines are due to individual orifices of the first and second conduit no longer flowing as the water level in the basin decreased during drainage.

Individual Orifice Discharge Versus Depth

Figure 13:
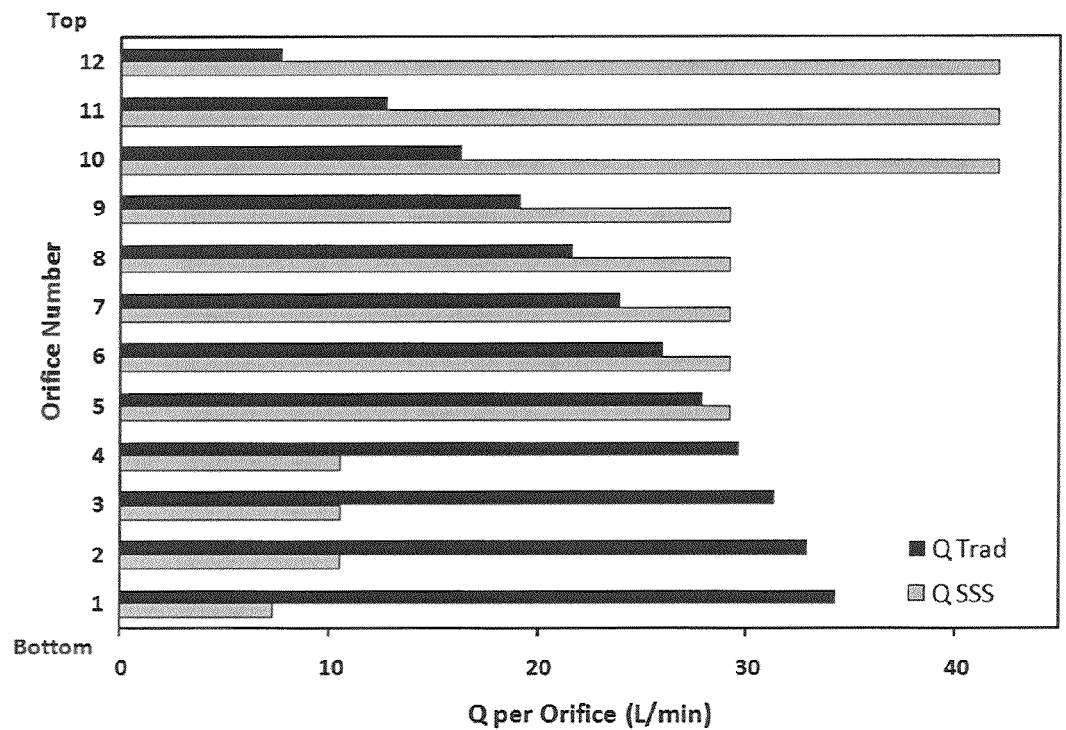
FIG. 13 shows the flow rate from each of the 12 first conduit orifices of the SSS riser, and also the flow rate from each of the 12 orifices of the Traditional riser.

FIG. 13 shows the flow rate from each of the 12 first conduit orifices of the SSS riser, and also the flow rate from each of the 12 orifices of the Traditional riser. As can be seen, the SSS riser has most of its flow from the upper orifices, whereas the Traditional riser has most of its flow from the bottom orifices. This fact enables the SSS to selectively skim water from the top of a basin and in doing so to allow less sediment to leave the basin.

Figure 11:
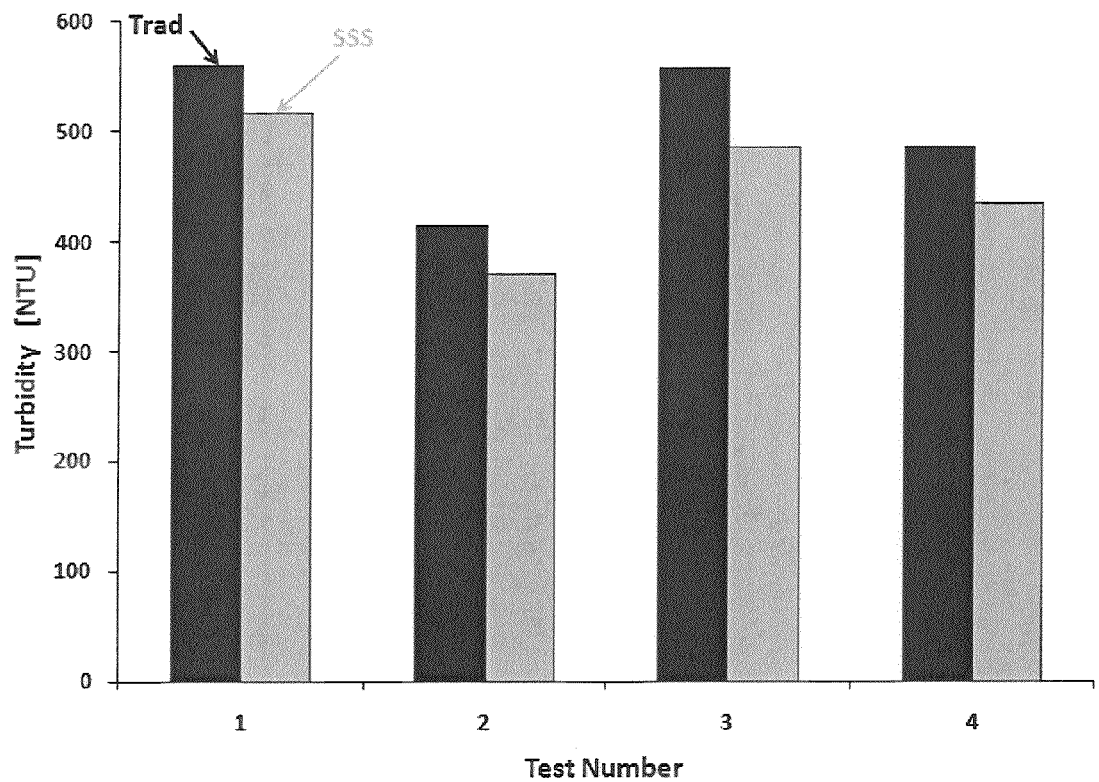
FIG. 11 provides a graphical depiction of results of a side by side trial between the SSS embodiment and a traditional riser, using a soil-based sediment in water. Comparisons of turbidity from four tests show that the SSS significantly reduces the turbidity discharged from the basin.

FIG. 11 provides a graph for Turbidity in NTU for each of the Traditional riser and the SSS for each of the four tests. In each of the four tests, it may be seen that the turbidity levels demonstrated improved performance (lower values) for the SSS than for the Traditional riser. The decrease in turbidity is significant ($a=0.05$).

Conclusions

The analytical (mathematical) model, capable of characterizing the orifice area distribution of a SSS with just three area fitting parameters and two delta head fitting parameters, was shown to provide a suitable approximation of the discrete orifice distribution. The flow from an SSS can be predicted using the three equations describing the three flow cases instead of having to numerically solve the flow for each individual orifice over variable head. This property of the analytical model greatly simplifies the design calculations. The inventors effectively designed the SSS of this experiment to match the stage-discharge relationship of a traditional riser, but other stage-discharge relationships may be investigated by one of ordinary skill in the art, and could be designed to optimize performance for a variety of desired outputs. The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. The scope of the described embodiments should only be deemed limited by the claims which follow.

What we claim is:

1. A hydraulic transistor comprising a fluid inflow device which receives a fluid and a fluid outflow device, a differential pressure head applied between a first fluid pressure head before the fluid inflow device and a second fluid pressure head between the fluid inflow device and the fluid outflow device causing a flow rate of the fluid inflow device to vary inversely proportional to the applied differential pressure head, wherein the fluid in flow device comprising a first vertical conduit and the fluid outflow device comprising a second vertical conduit within or subsequent to the first vertical conduit, the fluid outflow device being integral with or connected to a downstream outlet of the hydraulic transistor.

2. The hydraulic transistor of claim 1, the fluid inflow device and the fluid outflow device each comprising a flow restricting orifice.

3. The hydraulic transistor of claim 1, the fluid inflow device and the fluid outflow device each comprising a flow restricting pipe having one of a flow restricting orifice and a flow restricting weir.

4. The hydraulic transistor of claim 1, the fluid inflow device and the fluid outflow device each comprising a flow restricting weir.

5. The hydraulic transistor of claim 1, the fluid inflow device comprising one of a flow restricting orifice, a flow restricting pipe and a flow restricting weir and the fluid outflow device comprising one of a flow restricting orifice, a flow restricting pipe and a flow restricting weir.

6. The hydraulic transistor of claim 5, wherein an inlet of hydraulic transistor being the predominant source of fluid flow from the fluid outflow device when the differential pressure head applied is large, the predominant source of fluid outflow being between the fluid inflow device and the fluid outflow device of the hydraulic transistor when the differential applied pressure head is small.

7. The hydraulic transistor of claim 1 having a common pressure head located between the fluid inflow device and the fluid outflow device.

8. Multiple hydraulic transistors of claim 7 placed serially, a fluid outflow side of each serially placed hydraulic transistor being an applied pressure head side of each subsequent serially placed hydraulic transistor, the outflow from the last serially placed hydraulic transistor of the serially placed hydraulic transistors having minimal flow originating from the fluid inflow device of the last serially placed hydraulic transistor and maximum flow originating from the applied pressure head side of the first serially placed hydraulic transistor.

9. The hydraulic transistor of claim 6, the applied pressure head side being open to the atmosphere such that, if the applied pressure head exceeds a threshold, excess fluid flow spills out via the applied pressure head side and serves as an emergency spillway.

10. A hydraulic transistor comprising a fluid inflow device receiving a fluid and a fluid outflow device, a differential pressure head applied between a first fluid pressure head before the fluid inflow device and a second fluid pressure head between the fluid inflow device and the fluid outflow device causing a flow rate of the fluid inflow device to vary inversely proportional to the differential pressure head, wherein the fluid inflow device and the fluid outflow device each comprising a vertical flow restricting pipe comprising a flow restricting orifice.

11. The hydraulic transistor of claim 10, the fluid inflow device and the fluid outflow device comprising flow restricting pipes, each flow restricting pipe comprising one of a flow restricting orifice and a flow restricting weir.

12. Multiple hydraulic transistor in series having a common pressure head located between fluid inflow device and fluid outflow device of each hydraulic transistor, the multiple hydraulic transistors placed serially, each comprising the fluid inflow device and the fluid outflow device, a differential fluid pressure head applied between the fluid inflow device and the fluid outflow device of each hydraulic transistor in series causing a flow rate of the respective fluid inflow device to vary inversely proportional to the applied differential pressure head, a fluid outflow side of each serially placed hydraulic transistor being an applied pressure head side of each subsequent serially placed hydraulic transistor, the outflow from the last serially placed hydraulic transistor of the serially placed hydraulic transistors having minimal flow originating from the fluid inflow device of the last serially placed hydraulic transistor and maximum flow originating from the differential applied pressure head side of the first serially placed hydraulic transistor.

* * * * *